(12) United States Patent
Sharma

(10) Patent No.: US 10,965,208 B2
(45) Date of Patent: Mar. 30, 2021

(54) SYSTEM AND METHOD FOR A MULTI PURPOSE BIDIRECTIONAL POWER CONVERTER

(71) Applicant: Viswa Nath Sharma, Fort Myers, FL (US)

(72) Inventor: Viswa Nath Sharma, Fort Myers, FL (US)

(*) Notice: Subject to any disclaimer, the term of this patent is extended or adjusted under 35 U.S.C. 154(b) by 0 days.

(21) Appl. No.: 15/659,669

(22) Filed: Jul. 26, 2017

(65) Prior Publication Data

US 2017/0346386 A1 Nov. 30, 2017

Related U.S. Application Data

(63) Continuation of application No. 13/366,255, filed on Feb. 3, 2012, now Pat. No. 9,762,115.
(Continued)

(51) Int. Cl.
*H02M 1/10* (2006.01)
*H02M 3/335* (2006.01)
(Continued)

(52) U.S. Cl.
CPC ......... *H02M 1/10* (2013.01); *H02M 3/33584* (2013.01); *H02M 5/225* (2013.01);
(Continued)

(58) Field of Classification Search
CPC ........ H02M 1/08; H02M 1/10; H02M 1/4233; H02M 1/4241; H02M 1/4258; H02M 3/22; H02M 3/24; H02M 3/325; H02M 3/335; H02M 3/33507; H02M 3/33538; H02M 3/33546; H02M 3/33553; H02M 3/33569; H02M 3/33576; H02M 3/33584; H02M 3/33592; H02M 5/00; H02M 5/40; H02M 5/42; H02M 5/44; H02M 5/453; H02M 5/458; H02M 5/225; H02M 7/00; H02M 7/02; H02M 7/04; H02M 7/043; H02M 7/12; H02M 7/217; H02M 7/219;
(Continued)

(56) References Cited

U.S. PATENT DOCUMENTS

| | | | | | |
|---|---|---|---|---|---|
| 5,388,040 | A | * | 2/1995 | Hall | H02J 7/022 323/282 |
| 6,154,375 | A | * | 11/2000 | Majid | H02M 1/36 323/901 |

(Continued)

*Primary Examiner* — Thienvu Y Tran
*Assistant Examiner* — Carlos O Rivera-Perez

(57) ABSTRACT

The present invention is directed to Bidirectional Multimode Power Converter which employs a high frequency dynamically varying amplitude modulation and voltage steering-method to convert the source AC or DC voltages to output AC or DC voltages with programmable output voltage levels, output voltage frequency and duration. The Bidirectional Multimode Power Converters of the present invention support: inrush current control, turning off the idle converter, line voltage brown out protection, soft start, high pre-charge voltage generation, soft shut down of converter, dimming operation, programmable time of the day operation and operation for specified duration of time. The Bidirectional Multimode Power Converters of the present invention support coupling of multiple power sources for bidirectional power conversion.

6 Claims, 16 Drawing Sheets

Related U.S. Application Data

(60) Provisional application No. 61/439,367, filed on Feb. 3, 2011.

(51) Int. Cl.
*H02M 5/22* (2006.01)
*H02M 7/48* (2007.01)
*H02M 7/797* (2006.01)

(52) U.S. Cl.
CPC ......... *H02M 7/4807* (2013.01); *H02M 7/797* (2013.01); *H02M 2007/4815* (2013.01); *Y02B 70/10* (2013.01)

(58) Field of Classification Search
CPC ............ H02M 7/42; H02M 7/44; H02M 7/48; H02M 7/4807; H02M 7/53; H02M 7/537; H02M 7/5387; H02M 7/53871; H02M 7/797; H02M 2007/2195; H02M 2007/4811; H02M 2007/4818; H02M 2007/4815; H02M 2001/0048; H02M 2001/0054; H02M 2001/0058; H02M 7/4826; H02M 7/66–84; H02M 1/4208; Y02B 70/10; Y02B 70/1416; Y02B 70/1433; Y02B 70/1491; Y02B 70/1458; Y02B 70/1475; Y02B 70/1441; Y02B 70/14; Y02B 70/145; Y02B 70/146; Y02B 70/1425
USPC ............ 363/15–17, 19, 21.01–21.18, 34, 35, 363/39–43, 47, 65, 74–79, 89, 95–98, 363/123–127, 131–134; 323/205–211, 323/222–226, 235, 238, 239, 266, 323/271–275, 282–288, 351, 909
See application file for complete search history.

(56) References Cited

U.S. PATENT DOCUMENTS

| | | | | |
|---|---|---|---|---|
| 6,574,125 | B2 * | 6/2003 | Matsukawa | H02M 3/33569 363/132 |
| 9,762,115 | B2 * | 9/2017 | Sharma | H02M 1/10 |
| 2008/0013351 | A1 * | 1/2008 | Alexander | H02M 3/1582 363/123 |
| 2010/0182804 | A1 * | 7/2010 | Yang | H02M 3/3376 363/21.02 |
| 2011/0006691 | A1 * | 1/2011 | Blaha | H02M 7/217 315/185 R |
| 2011/0103097 | A1 * | 5/2011 | Wang | H02M 3/33592 363/17 |

* cited by examiner

AC-AC Mode
Every Alternate one or a alternate group of Cycles
Switches 1A and 1D on
Switches 1B and 1C off; and
Switches 1B and 1C on
Switches 1A and 1D off;

——— +DC
=== GND

DC-AC Mode
Every Alternate one or a alternate group of Cycles
Switches 1A and 1D on
Switches 1B and 1C off; and
Switches 1B and 1C on
Switches 1A and 1D off;

AC-DC Mode
Switches 1A and 1D on
Switches 1B and 1C off; for Positive Half Cycle of the AC Wave;
Switches 1B and 1C on
Switches 1A and 1D off;
For Negative Half AC Wave

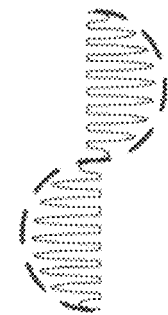
Figure – 12A
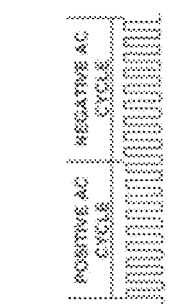
Figure – 12B
Figure – 12C
Figure – 12D
Same Frequency AC-AC
Mode
Every CYCLE
Switches 1A On and Off
Switch 1D on
Switches 1A and 1D off;
Switches 1B and 1C off;
All the times
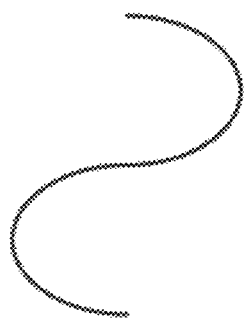
+DC
GND
Figure – 13A
Figure – 13B
Figure – 13C
Figure – 13D
DC-DC Mode
Every CYCLE
Switches 1A On and Off
Switch 1D on
Switches 1A and 1D off;
Switches 1B and 1C off;
All the times
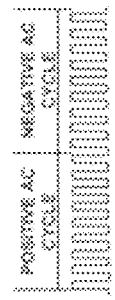

SYSTEM AND METHOD FOR A MULTI PURPOSE BIDIRECTIONAL POWER CONVERTER

PRIORITY CLAIM

The present invention claims priority to U.S. patent application Ser. No. 13/366,255, filed on Feb. 3, 2012, entitled "Bidirectional Multi Mode Power Converter", which claims priority to U.S. Provisional Application Ser. No. 61/439,367, filed Feb. 3, 2011, entitled "Multimode Switched Power Converter", the disclosure of which is hereby incorporated by reference.

FIELD OF THE INVENTION

The present invention relates generally to bidirectional electric power conversion technology and in particular to a Multimode Switched Power Converter.

BACKGROUND OF THE INVENTION

Traditional source of electric power are fossil fuels plants, hydro electric and nuclear power plants. These plants serve many remote consumers using power transmission network or Power Grid. For efficient transmission of the power generated at the generating stations to the consumers, the power grid uses Alternate Current (AC) technology. Private residences, industrial complexes, streets, public buildings and other facilities use the AC power. The AC power generated in different countries has different line voltages and line frequencies.

Alternate energy sources such as Solar Power, Fuel Cells and Wind Energy are being produced. The energy generated using alternate energy is typically Direct Current (DC). Large amounts of electrical energy cannot be stored economically. Small quantity of generated energy is stored in batteries. Either all of the generated electrical power is used or the power is generated when there is a demand for energy.

Electrical power can be produced on demand with fossil fuels and fuel cells. The power generated from the nature's sources such as solar energy and wind energy can only be generated when those sources are available. Excess electrical energy, that cannot be consumed at a particular location or stored in local batteries, is fed back to the traditional power grid. To be compatible with the traditional AC power grid and electric appliances, the DC electrical power generated from these alternate sources are converted to AC power.

A power converter or a power supply converts the Alternating Current (AC) electrical power at line voltage and frequency to Direct Current (DC) or AC to AC at different voltage levels and frequencies or DC to DC at different voltage levels used by electronic appliances and equipment. A power inverter converts DC at to AC voltages and frequencies.

The use of power supplies and inverters has increased, due to ubiquity of consumer and enterprise electronic products and increased reliance on alternate energy sources. U.S. Environmental Protection Agency, in their presentation "A Strategy to Improve the Efficiency of Power Supplies" estimate that there are more than 10 billion AC/DC power supplies used in computing, telecommunications and consumer electronics worldwide. The portable power supplies and battery chargers used for hand held electronic equipment are experiencing growth due to ubiquitous lap top personal computers, cellular telephones and other hand held electronic equipment. These electronic equipments use different voltage types such as AC or DC and at different voltage levels, frequencies and power conversion capacity. Different type of converters and or inverters may be in use at the same facility for different electronic appliances.

Inefficient incandescent bulbs are being used for lighting ail over the world. International Energy Agency (IEA) claims that a switch over to efficient lighting systems could reduce global electrical demand by nearly 10 percent. To replace incandescent lamps, low voltage compact fluorescent lamps, florescent lamps, Light emitting diodes (LED), and other low voltage lighting products are being used in increasing numbers. The low voltage power for these lighting products is facilitated by power converters. Some of these converters are plugged into the wall sockets even when they are not is use. The converters consume power when they are idle, wasting energy. The energy wasted due to power converter inefficiencies increases as the number of the converters increase. High conversion efficiency, shutting off converters on Idle mode and Multimode operation to reduce the number of converters in a location contribute significantly for energy saving.

Electric Vehicles (EV) use electric power stored m DC batteries. The DC battery energy is converted to various DC and AC voltage levels to operate the Electric vehicle motors. AC Energy stored in the motor windings has to be converted back to DC voltages when the breaks are applied. Therefore, bidirectional inverters and converters are needed. The batteries operated by chemical reactions to store or charge and deliver power. So, batteries are limited by the slow chemical conversion time. Method of delivering power on demand while the Electric Vehicle is operating is needed. Fast charging method of batteries at home and public power fueling stations are also needed.

Linear Power Supplies (LPS) and or Switched Mode Power Supplies (SMPS) are used for power conversion and inversion. LPS convert the utility line voltage AC, at line frequencies, to required AC voltage levels at utility line frequencies using step up or step down transformers. The converted AC voltage is used for AC applications or it is rectified, transformed and regulated to the desired DC voltage level.

The utility AC line of different countries, has different line voltages and line frequencies. A common LPS can be designed to address different voltages by the use of multiple windings on the transformer and selecting the winding for the specific voltages. U.S. Pat. No. 5,973,948 illustrates a mechanical switching method using two transformer windings for two different line voltage levels.

Transformers and magnetic inductors are two major components of the power conversion technology. Transformers are used to provide galvanic isolation and voltage conversion. Utility AC line frequencies are normally between fifty and sixty cycles per second or Hertz (Hz). Four hundred (400) Hz is power used in the aircrafts. The physical size of magnetic components varies inversely with the frequency. As a result, the magnetic transformer in art LPS is large because it uses low line frequency directly. Most LPS use linear regulators, which are inefficient and need large heat sinks.

Switched Mode Power Supplies (SMPS) overcome the size and efficiency limitation of the linear supplies. In an SMPS, the utility line voltage AC is rectified to DC using a diode bridge. The rectified voltage is boosted to a high voltage level to provide Power Factor correction and universal operation for varying utility voltages. The boosted common DC voltage is converted to the desired DC voltage levels using DC-to-DC converters, or desired AC voltages using DC-to-AC inverters. The DC-to-DC and DC-to-AC converters or inverter use high frequency switches and transformers. The switching frequencies range from thousands of hertz to hundreds of thousand hertz. So, SMPS uses smaller sized magnetics compared to LPS. However, even these magnetic components are over thirty percent of the overall volume of an SMPS.

The power converter or inverter of the state of the art can be viewed as a composite of many conversion stages. In a LPS Transformer Stage, Rectifier Stage and Output Voltage Regulation stage are generally used. In an SMPS Rectifier Stage, power Factor Correction stage (PFC), DC Boost Stage and DC-to-DC Conversion Stage, and Output Voltage Regulation stage. Additional functions such current Inrush control, soft start, dimming, pre-charge stages are implemented for different applications. The efficiency of a SMPS depends on the conduction and switching losses in its electronic components. Each stage of an advanced SMPS operates near ninety percent efficiency compared to less than eighty percent of the Linear Power Supplies. However, multiple stages employed in SMPS reduce the cumulative efficiency of the overall system. A three stage SMPS with 90% efficiency yields an effective 73.1% efficiency.

Each stage of SMPS power conversion is going through changes for improvements in cost, size and efficiency. To achieve higher efficiencies, methods to reduce the number of conversion stages, methods to replace loss prone elements such as diodes in the conduction path with the semiconductor switches, methods to increase switching frequencies and reduce noise by using monolithic packages have been illustrated. In addition, methods to replace magnetic transformers with piezoelectric transformers and method to eliminate the magnetics for conversion have been illustrated as described herein The diode used for rectification stage can be replaced with semiconductor switches. U.S. Pat. No. 6,563,726 illustrates a synchronous bridge rectifier for rectifying AC input to DC with low conduction loss. U.S. Pat. No. 5,510,972 illustrates a bridge rectifier with an active switch and control circuits. U.S. Pat. No. 7,408,796 illustrates an integrated synchronous rectifier package.

Combining PFC and DC-to-DC conversion to one stage is being tried. A paper titled. Single Stage Isolated PFC Topologies, by Steven M. Sandler, Charles Hymowitz, Harold Etcher illustrates topologies for single stage PFC and isolation. Single Stage ZVS-FWM inverter outlined in the paper titled "Commercial Frequency AC to High Frequency AC Converter with Boost-Active Clamp Bridge Single Stage ZVS-PWM Inverter" published in IEEE Transaction on Power Electronics, Volume. 23, No. 1, January 2008, exemplify the attempts to increase efficiency of a high frequency Induction heating element with these techniques.

A paper titled "Power Factor Correction and Efficiency Investigation of AC-DC Converters Using Forced Commutation Techniques" by K. Georgakas, A. Safacas, in IEEE ISIE 2005, Jun. 20-23, 2005, Dubrovmk, Croatia, investigates power factor correction and efficiency using MOSFET bridges and forced commutation techniques.

It is well known in the art of the inrush currents due to link capacitors used to smooth ripple currents and holdup capacitors provide continued service for a short time. To mitigate the inrush current, soft start circuits or inrush control circuits are used. The circuits to control inrush currents are provided at the AC Line inputs or the rectified output sections.

"Investigation of High-density Integrated Solution for AC/DC Conversion of a Distributed Power System" Dissertation submitted by Bing Lu to the faculty of the Virginia Polytechnic Institute and State University in partial fulfillment of the requirements for the degree of Doctor of Philosophy in Electrical Engineering illustrates methods to reduce the hold up capacitor size.

U.S. Pat. No. 5,920,186 illustrates a Triac relay based control circuit for utility AC line before rectification. U.S. Pat. No. 5,903,451 illustrates a variable frequency start up circuit for the rectified line AC voltage. The charging current of the link capacitors is controlled using a switch and a control circuit. U.S. Pat. No. 7,379,311 B2 illustrates inrush current limiting circuits and its control for use in the rectified stage. The current limiting resistors used in these circuits turn on when the inrush conditions due to Power supply start up or changes voltage levels are detected.

U.S. Pat. No. 6,115,267 illustrates an AC-DC power converter with no input rectifiers and no PFC stage and uses switching means connecting the primary winding of the transformer to AC source. Back to back, MOSFET Switches are used in U.S. Pat. No. 6,115,267 so that the output of the push-pull transformer is of the same polarity regardless of the polarity of the instantaneous input. The use of MOSFET also facilitates soft start stage.

The size of the magnetics decreases as the switching frequency increases. Planar transformers are being used, to reduce the size and reduce conversion losses. U.S. Pat. No. 5,010,314 illustrates a low profile planar transformer with printed circuit hoard and magnetic housing for switching frequencies of one mega Hz (1 MHz). U.S. Pat. No. 7,414, 510 illustrates methods to reduce the size of planar transformer as compared to the transformer size of U.S. Pat. No. 5,010,314.

Piezoelectric transformers are used to overcome the noises generated by magnetic transformers. U.S. Pat. No. 5,969,954 demonstrates an AC-DC converter with piezoelectric transformer. U.S. Pat. No. 6,738,267 B1 illustrates the design of a Switched Power Converter with a piezoelectric transformer.

The magnetic core can be eliminated with frequencies above 1 MHz. US patent application publication US 2005/0156699 A1 illustrates a coreless PCB transformer signal and energy transfer. U.S. Pat. No. 5,583,421 illustrates a switched mode Single Ended Primary Inductor Converter (SEPIC) to achieve Line isolation with out the use of transformers. U.S. Pat. No. 6,873,139 illustrates generating negative voltages with out using transformers.

A paper titled "A novel AC-DC Converter un-requiring inductors for power conversion" published by Man-Seop Lee; Young-Chang Cho; Hyeong-Woo Cha, Applied Power Electronics Conference and Exposition, 2008, APEC 2008. Twenty-Third Annual IEEE Volume, Issue, 24-28 Feb. 2008 Page(s): 1358-1360, demonstrates an SMPS, which does not use inductors and high voltage capacitors for rectification. This design features very low no load power but does not provide galvanic isolation.

The technological advances hereto illustrated are specialized for each individual converter and inverter applications such as AC-to-DC; AC-to-AC, DC-to-AC and DC-to-DC. These prior art supplies used multiple conversion stages. Even with reduced number of power conversion stages in specific applications, prior art converters do not yield high efficiency.

The department of energy states that disruptive power conversion architectures are necessary to meet the cost and efficiency goals to make alternate energy such as solar power commercially feasible. Disruptive power conversion architecture is needed eliminate many different power supplies, by combining many output levels, each consuming power even when they are idle.

The need exists for novel architectures to meet the multi faceted electric conversion needs with improved efficiency, smaller size and lower costs for use in appliances, lighting, electronic equipment, alternate energy generators and electric vehicles. The need exists for bidirectional power converters. Need exists to provide multiple feature such as, programmable output type (AC or DC), output levels, output frequency and duration, in a single converter to reduce the number of converters used. The need exists to provide additional functions, with the same-modules used for power conversion, such as but not limited to high voltage pre-charge, diming, soft start and current inrush control. The need exists for quick charging and discharging of electric power for Electric Vehicle operation and power holdover functions in the event of power outage. The need exists for compact power converters for portable operations. The need exists to implement power conversion with common semiconductor chips and common modules. The need exists to utilize multiple high efficiency converters in parallel to provide, higher capacity conversion with out affecting overall conversion efficiency.

SUMMARY OF THE INVENTION

The present invention is directed to Bidirectional Multimode Power Converter architecture to convert power from either an AC or a DC input source, modulating the input dynamically and synchronously steering the modulated power to provide continuous or pulsed, AC or DC outputs, with programmable voltage level, frequency and duration, in a bidirectional fashion.

In addition, the Bidirectional Multimode Power Converter architecture of the present invention supports features, such as but not limited to, inrush current control, idle converter detection and shut down, line voltage brown out protection, soft start, high pre-charge voltage generation, soft shut down of converter, and dimming, inherently without the need for external modules.

Furthermore, the Bidirectional Multimode Power Converter of the present invention supports local and remote control for changing operational characteristics of the converter on demand or on a programmed time of the day for a specified duration of tune.

In addition, the Bidirectional Multimode Power Converter architecture of the present invention mediates fault tolerance and load sharing by switching in an additional input source or additional output load into operation as a backup power source or backup load without the use of additional Oring diodes.

Furthermore, the Bidirectional Multimode Power Converter architecture of the present invention facilitates parallel operation of multiple converters from either AC or DC source to supply an AC or DC load. It should be appreciated that in such parallel operation the overall conversion efficiency of the converter is not compromised by multiple converter usage.

In exemplary embodiments, the Bidirectional Multimode Power Converter of the present invention facilitates streamlining for a specific operation, such as AC-to-DC conversion, by eliminating modules and components that are not needed for that specific operation, without deviating from the Multimode Switched Power Converter architecture. Similarly, active and passive elements each of the modules of the exemplary embodiment could be commissioned and decommissioned during the operation of the converter to implement the multimode functions.

The invention may be more completely understood in consideration of the following detailed description of exemplary embodiments of the invention with the accompanying drawings.

BRIEF DESCRIPTION OF THE DRAWINGS

FIG. 8A shows conversion of DC to Pulsating DC.
FIG. 8B shows DC to modified Sine wave conversion.
FIG. 8C shows AC to Rectified AC conversion.
FIG. 8D shows AC to pulsating Rectified AC conversion.
FIG. 8E shows conversion of AC to programmable high frequency AC without amplitude changes.
FIG. 8F shows Modified Sine wave to pulsating DC conversion.

FIGS. 9A, 9B, 9C and 9D illustrate fee AC input voltage, switch frequency waveform representation over the positive and negative half cycles of the AC input, the switched output voltage waveform, and the switch combination respectively for the AC-DC operation of the Multimode Switched Power Converter shown in FIG. 7.

FIGS. 10A, 10B, 10C and 10D illustrate the AC input voltage, switch frequency waveform representation over the positive and negative half cycles of the AC input, the switched output voltage waveform, and the switch combination respectively for AC-AC operation of the Multimode Switched Power Converter shown in FIG. 7.

FIGS. 11A, 11B, 11C and 11D illustrate the AC input voltage, switch frequency waveform representation over the positive and negative half cycles of the AC input, the switched output voltage waveform, and the switch combination respectively for DC-AC operation of the Multimode Switched Power Converter shown in FIG. 7.

FIGS. 12A, 12B, 12C and 12D illustrate the AC input voltage, switch frequency waveform representation over the positive and negative half cycles of the AC input, the switched output voltage waveform, and the switch combination respectively for the AC to same frequency AC operation of the Multimode Switched Power Converter shown in FIG. 7.

FIGS. 13A, 13B, 13C and 13D illustrate the AC input voltage, switch frequency waveform representation over the positive and negative half cycles of the AC input, the switched output, voltage waveform, and the switch combination respectively for the DC-to-DC operation of the Multimode Switched Power Converter shown in FIG. 7.

DETAILED DESCRIPTION OF THE PREFERRED EMBODIMENTS

Various exemplary embodiments of the invention are shown in a modular fashion. The diagrams are not meant to be detailed schematics. However, each module, as shown in the diagrams, accurately depicts all of their operations, in detail. Circuit elements, such as those used to meet regulatory agency requirements are not shown. The modules with the same number are used in various drawings to show similar modes and operation. The mode and operations of the modules are shown using typical functional diagram and circuit components. The functions of any given module can be realized with other components than those that are illustrated in the figures. When multiple instances of the Multimode Switched Power Converter Modules are used, each instance of the same module can be realized with different circuit elements, within the scope of the invention.

The switch elements of the inventions, conduct positive, negative, and alternating polarity current when turned "ON" and block positive, negative, and alternating polarity current when turned "OFF". A bidirectional switch element serves this need for both AC and DC conversion environment. In certain conversion environments, other elements can be used with out deviating from the scope of the invention. The switches operate in static states, such as always ON or always OFF, to high frequency switched ON/OFF states, as needed for a particular power conversion mode.

One embodiment of the Bidirectional Multimode Power Converter architecture provides power conversion by chopping the input AC or DC power to pulses and dynamically modulating the amplitude of each chopped pulse to match the desired AC or DC output voltage level, frequency and duration. Filter circuits are used to provide output regulation. In a Bidirectional converter embodiment of the input power source and the output power source are reversible.

Figure 1:
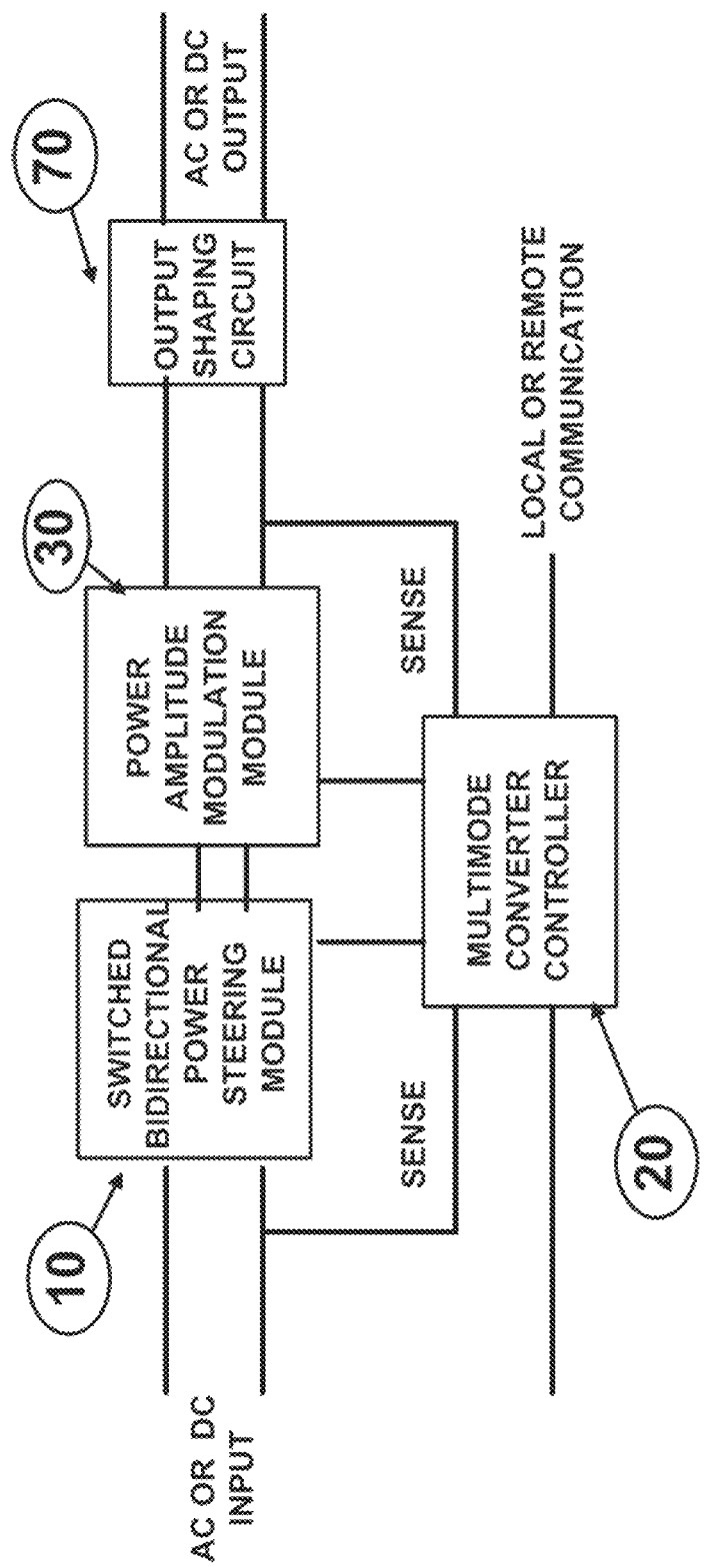
FIG. 1 is a block diagram of the Multimode Switched Power Converter comprising Power Amplitude Modulation Module 30, Switched Bidirectional Power Steering Module 10 and a Multimode Converter Controller Module 20, and output shaping circuit 70, in accordance with one embodiment of the present invention to convert AC or DC voltage from an input power source to an AC or DC voltage output, with programmable frequency, voltage level and duration.

FIG. 1 shows the block diagram depicts an exemplary embodiment of the Bidirectional Multimode Power Converter with three main modules: a Switched Bidirectional Power Steering Module 10, Multimode Converter Controller Module 20 and a Power Amplitude Modulation Module 30.

Figure 3:
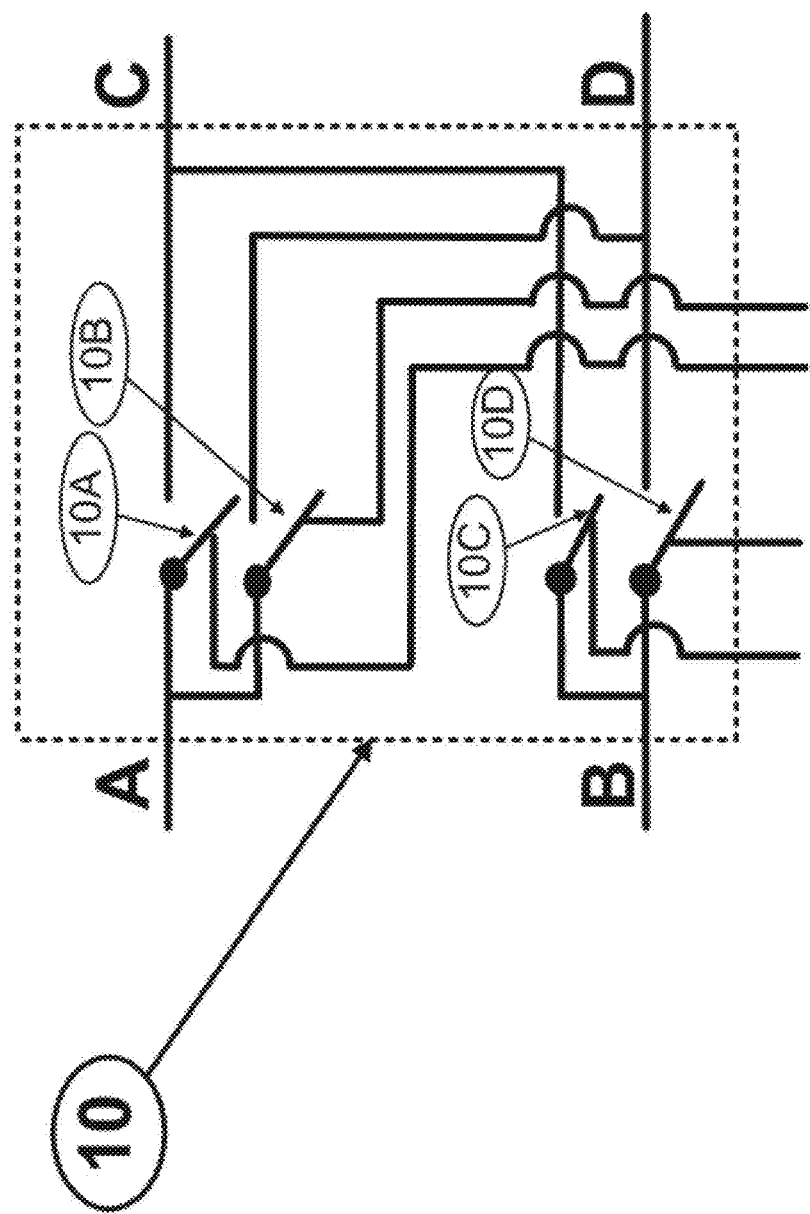
FIG. 3 depicts the details Switched Bidirectional Power Steering Module 10, according one embodiment.

FIG. 3 shows one embodiment of Switched Bidirectional Power Steering Module 10. In this embodiment, a four terminal Switched Bidirectional Power Steering Module 10 bridges two power sources with two terminals on each side. Switch elements 10A, 10B, 10C and 10D are interconnected to form a bridge with four terminals A, B, C and D. As shown in FIG. 3, terminal A is connected to one end of switches 10A and 10B and terminal B is connected switch to one end of switches 10C and 10C to form one port of the bridge. Terminal C is connected to the other ends of switches 10A and 10C terminal D is connected to the other ends of switches 10B and 10D to form the second port of the bridge. The Switched Bidirectional Power Steering Module 10 can be used for chopping an AC or DC input power source by opening and closing switches 10A, 10B, 10C and 10D of the Switched Bidirectional Power Steering Module 10. Each side of the bridge is capable of converting AC-to-DC, DC-to-AC and AC-to-AC and DC-to-DC by opening and closing switches 10A, 10B, 10C and 10D of the Switched Bidirectional Power Steering Module 10. The switch opening and closure operations are controlled by a controller, such as the exemplary embodiment Multimode Converter Controller Module 20.

For a given power conversion application, only one or a few of the possible Switched Bidirectional Power Steering Module 10 features and operations may be needed. In some instances, some of the switches may always be turned ON or turned OFF. In some instances, a particular bridge path may not be needed. In these instances, the switches may be substituted with other circuit elements such as Diodes or eliminated without deviating from the scope of the invention. The specific switch operations are more clearly illustrated in the exemplary embodiments of the invention.

Figure 4:
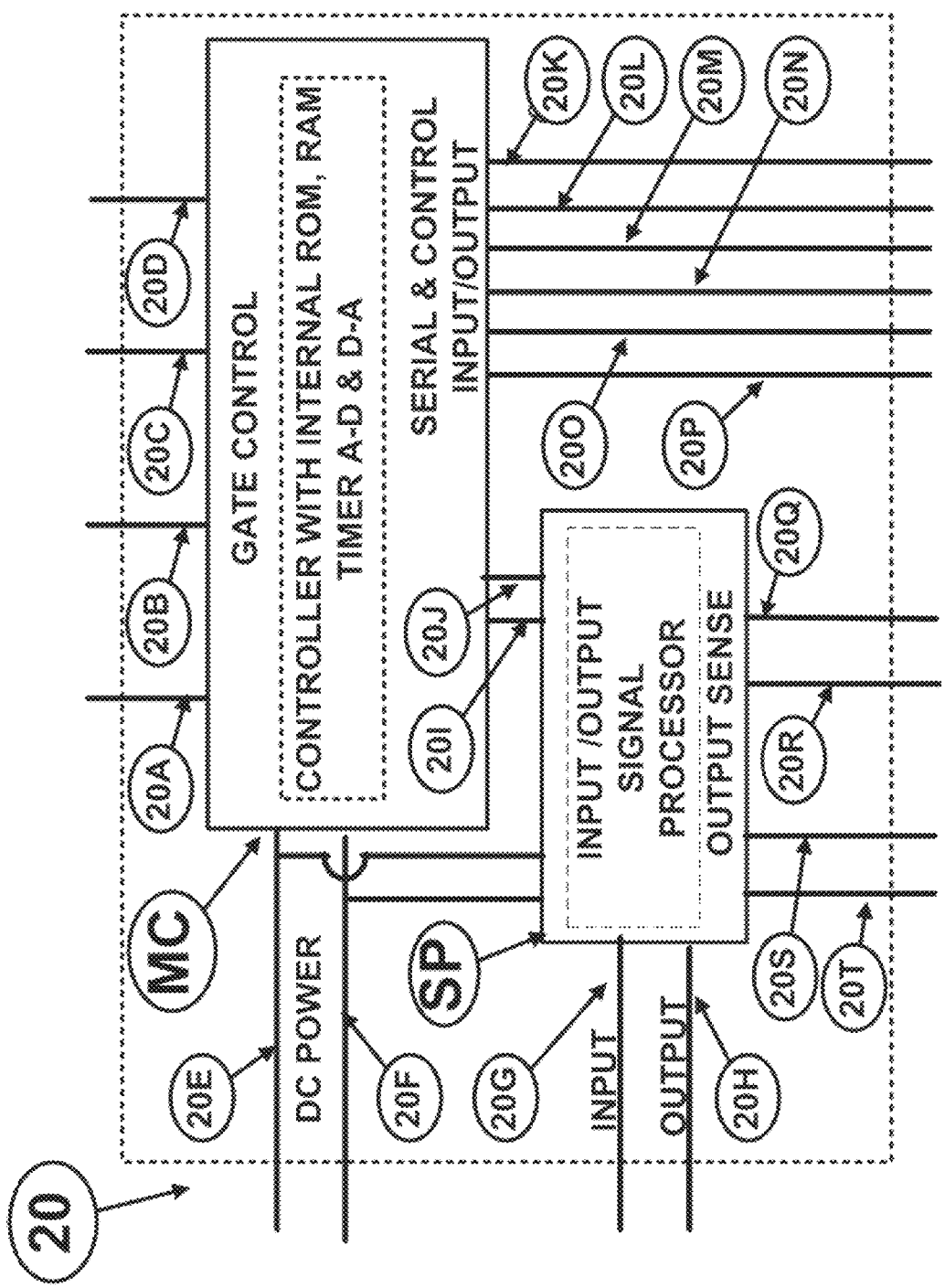
FIG. 4 depicts details Multimode Converter Controller Module 20 of one embodiment.

One embodiment of the Multimode Converter Controller Module 20 is depicted in FIG. 4. The Multimode Converter Controller controls the switching operation of the Switched Bidirectional Power Steering Module 10 and other switches used for converter operation, based on the power Input, Desired Power Output, and other operational parameters provided to the controller. Power input, and the Power Output are sensed to take appropriate corrective actions in the event of disruptions and synchronies the outputs to loads, such as utility AC grid or local AC grid.

Figure 2:
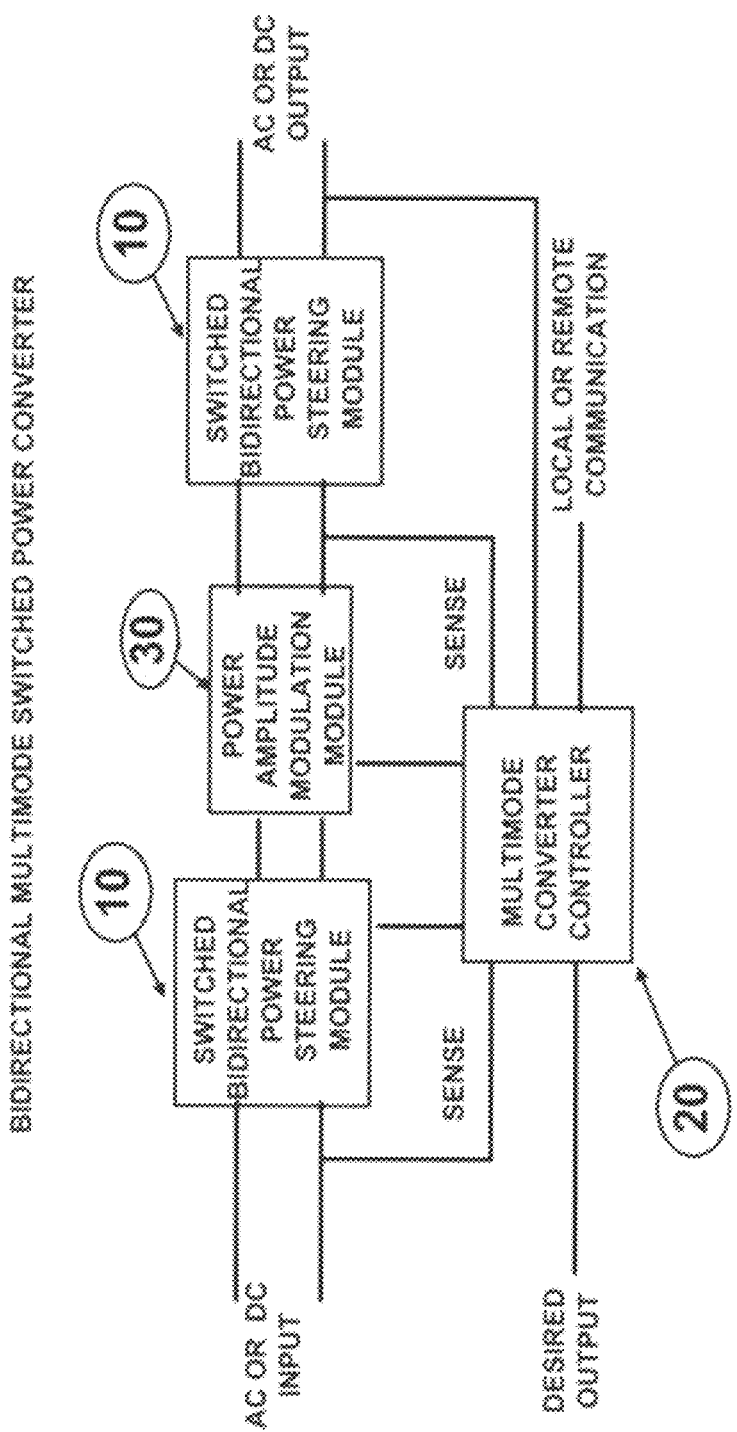
FIG. 2 is a block diagram of the Multimode Switched Power Converter comprising two Power Amplitude Modulation Module 30, two Switched Bidirectional Power Steering Module 10 and a Multimode Converter Controller Module 20, in accordance with one embodiment of the present invention, to convert AC or DC voltage from an input power source to an AC or DC voltage output, with programmable frequency, voltage level and duration. This embodiment supports bidirectional operation.

Multimode Converter Controller Module 20 is implemented with a Microcontroller MC and an Analog Signal Processor Block SP. Controllers other than those shown in the FIG. 2 can be used, to provide all the functions of the Multimode Converter Controller Module 20. DC power is connected to the Microcontroller MC and the signal Processor SP using link 20E and Link 20F. Link 20G provides input power type and Link 20H provides the desired output type information to the Microcontroller MC.

The microcontroller MC comprises of volatile and nonvolatile memory for storing its program and data. It comprises of Analog to Digital and Digital to Analog converters and Timers. It supports serial interfaces with serial links 20M and 20N. Links 20K, 20L and 20O, 20P provide control inputs and outputs, such as galvanically isolated dimmer potentiometer inputs and Switched Element Controller gate control outputs. Links 20Q, 20R, 20S and 20T provide support for analog input and or output power sensing elements. Links 20I and 20J connect the Signal Processor SP block to the Microcontroller MC.

The serial interface can support different protocols, including but not limited to Internet Protocol, de-facto industry standard 12C protocol, to accommodate the Radio Frequency interface, Ethernet Interfaces, 12C interface. Other serial interfaces can be supported dependent on the specific implementation of the Multimode Converter Controller Module 20.

Links 20A, 20B, 20C and 20D provide the gate control signals to the switches, such as the gates of the switches of the Switched Bidirectional Power Steering Module 10.

The Input and the Desired Output parameters can be analog signals or digital information supplied locally, such as from switches closures or programmed from remote sources using the serial interface.

The input and output sensing functions include, output current, voltage, frequency, and current and voltage phases of power input and power output. Multimode Converter Controller analyses the representative analog signals to determine, including but not limited to, amplitude, frequency, zero crossing, abnormal voltage spikes, power disruptions, of the inputs and outputs using pre-determined scaling factor. This information is used for taking corrective actions for the continued operation of the converter in case of disruptions.

The operation modes of the Microcontroller MC can be controlled locally or remotely using the serial interface. New operational features as well as existing feature modification can be accomplished by loading new firmware to the controller MC nonvolatile memory using serial interface. The digital information records of the sensed input and outputs, errors and other details can be recorded internally in the volatile or non-volatile memory and can be provided to an external monitoring source using the serial interface. An external monitor source can use tins information for power quality measurement of the system environment and for taking other actions needed for a Power System or Power Grid.

Power Amplitude Modulation Module 30 dynamically changes the amplitude of the input voltage and current to match the desired output. One exemplary embodiment of the present invention implements amplitude modulation by continuously varying the gain of the conversion circuit. The conversion circuit gain can be continuously increased, decreased, or operated at a fixed gain. It is well known in the art that the gain of an LLC circuit can be varied by varying the frequency of operation above or below the resonant frequency, for buck as well as boost operations. The frequency deviations from a resonant frequency, alters the impedance of the LLC circuit disadvantageously and causes power loss.

In the art, the LLC circuits are used in DC circuits, for either bucking or boosting the input voltage, with fixed frequency, at unity gain. Frequency deviations from the normal resonant frequency are used to correct infrequent input power variations.

Figure 5:
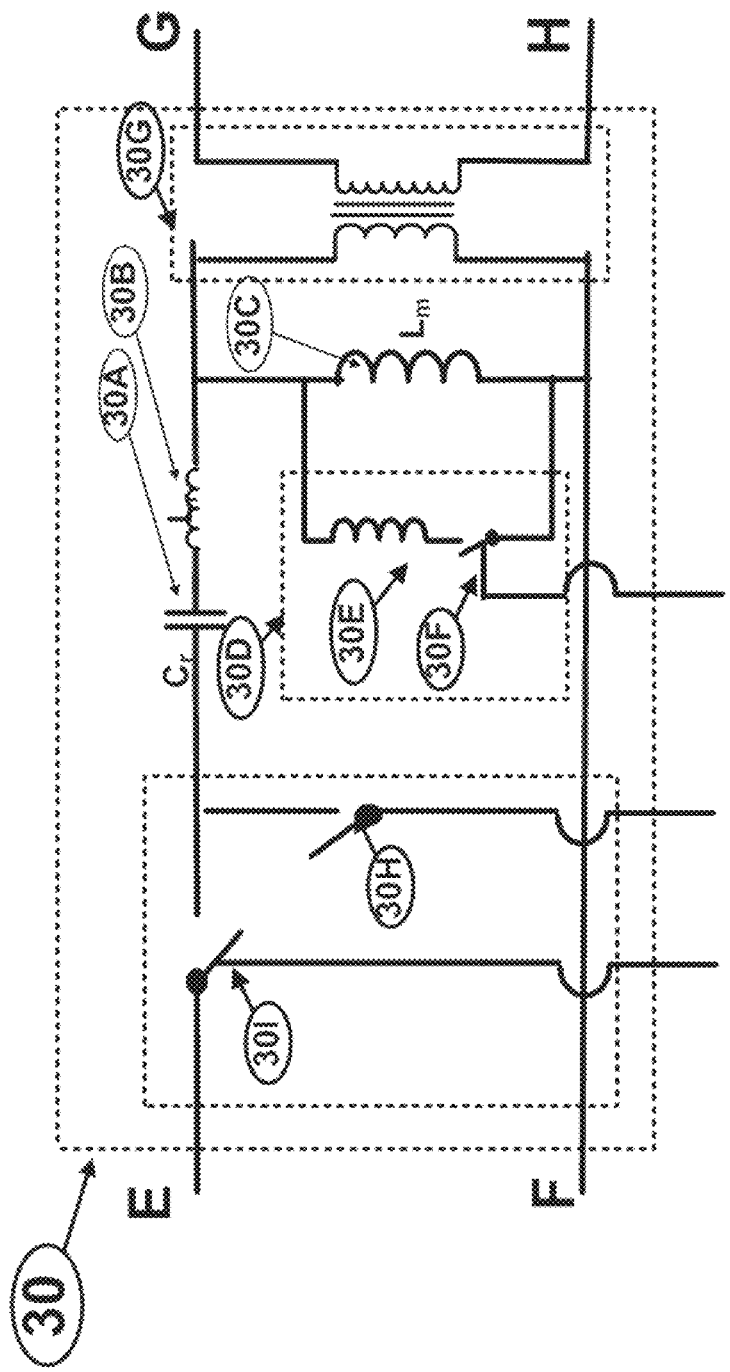
FIG. 5 depicts details Power Amplitude Modulation Module 30 of one embodiment.

The Power Amplitude Modulation Module 30 in one embodiment as shown in FIG. 5 uses passive elements Inductor-Inductor-Capacitor (LLC) to form a resonant circuit. The Power Amplitude Modulation Module 30 is capable of continuously varying frequency of operation and thus is a Variable Gain Circuit for AC as well as DC operations. However, other Variable Gain Circuits can be used to accomplish the Buck and Boost operations, with in the scope of the invention.

Terminals E and F, of the Power Amplitude Modulation Module 30, are connected to a power input Source and Terminals G and H, are connected to an output load. As shown in FIG. 5, Capacitor 30A, Inductor 30B and Inductor 30C are connected in series to form the LLC resonant circuit. An optional switched inductive element 30D consisting of Inductive element 30E and switch 30F, is connected across the Inductor 30C such that the inductor 30C value can be changed by opening or closing the switch 30F. The choice of using switched series elements or switched parallel elements depends on the application environment and components used for the Multimode Switched Power Converter. An optional transformer 30G is, shown in the exemplary embodiment can be used if the application demands isolation and or power amplitude changes. The transformers used could be high frequency magnetics such as Planar Transformers, Piezoelectric Transformers. The physical size of the magnetic elements varies proportionally with the frequency of operation. In a Mutlimode Switched Power Converter of the present invention, the Switches of the Switched Bidirectional Power Steering Module 10 limit the frequency to available components at given time. The Multimode Switched Power Converter architecture can be used with higher or lower operable frequency of the circuit elements, Other techniques, which provide isolation and or power amplitude changes, can be used without deviating from the architecture of the present invention.

Figure 16:
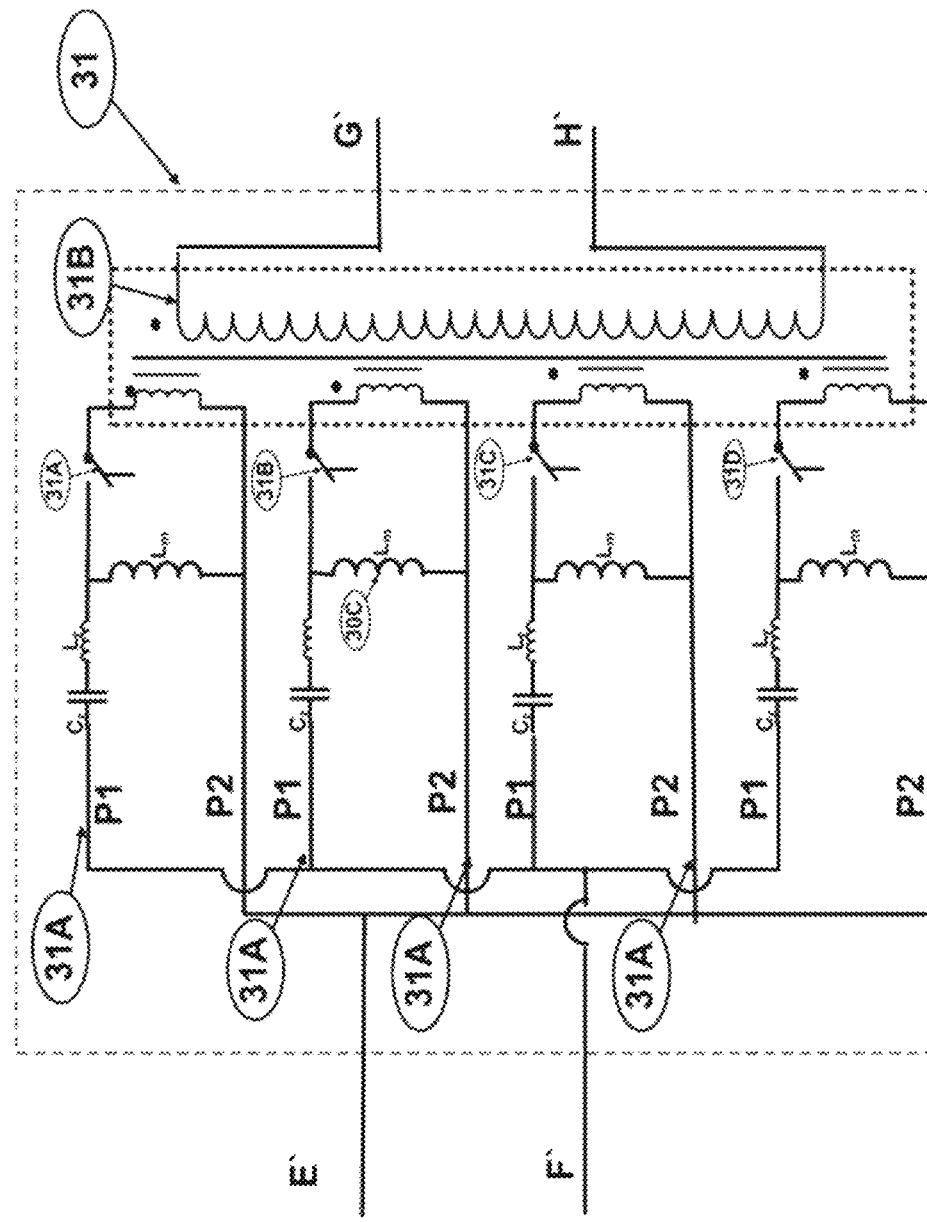
FIG. 16 depicts one embodiment of the Power Amplitude Modulation Module comprising of multiple LLC circuits that could be switched to vary the amplitude of the input voltage, with a combining transformer.

An alternate embodiment of Power Amplitude Modulation Module 31 is shown in FIG. 16. The Power Amplitude Modulation Module 31 of FIG. 16 uses multiple LLC circuits 31 AG, 31 BG, 31 CG and 31 DG tuned to different gains. When amplitude modulation is required, one or more circuits can be switched into operation by closing switches 31A, 31B, 31C and 31D. The modulated power is combined at the combining transformer 31T.

Figure 6:
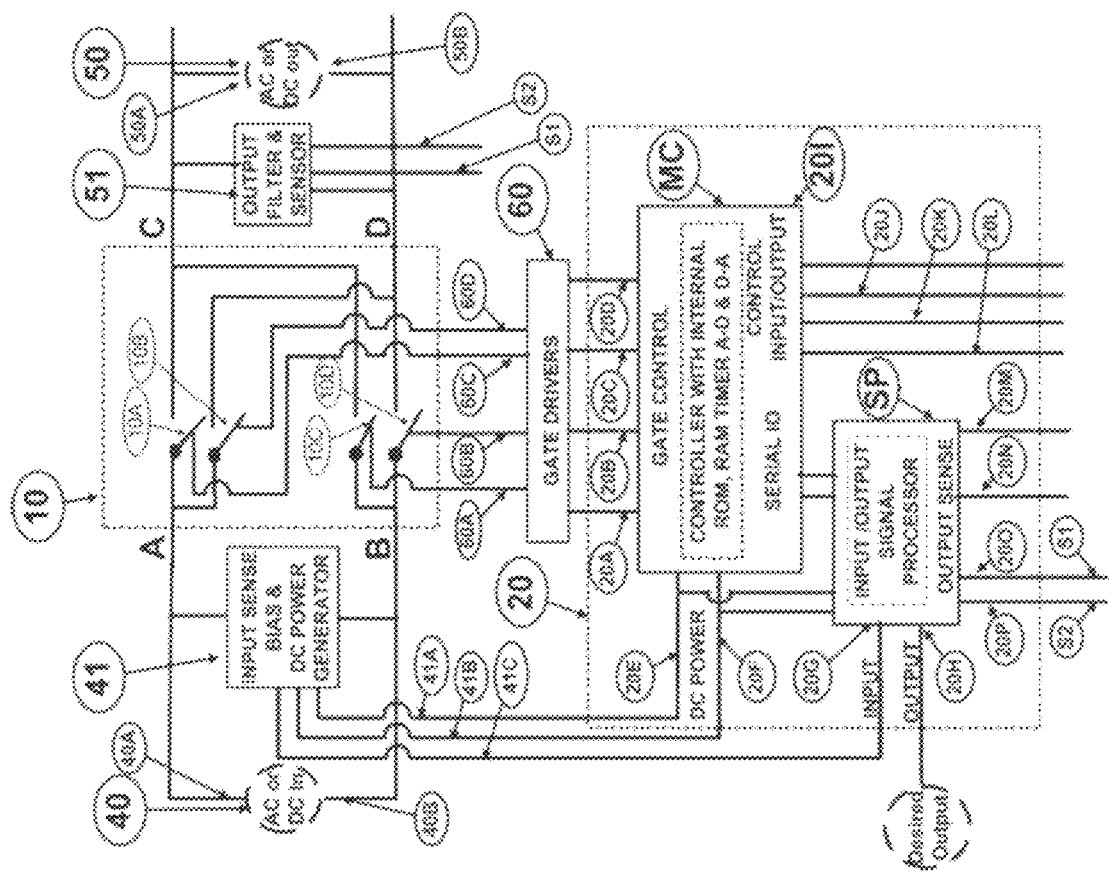
FIG. 6 shows one embodiment of a Multimode Switched Power Converter Module without the Power Amplitude Modulation Module.

FIG. 6 shows one embodiment of the Multimode Switched Power Converter comprising the Switched Bidirectional Power Steering Module 10 and the Multimode Converter Control (controller) Module 20, for application that do not need Power Amplitude and Shaping. Many inverter and converter configurations can be derived with this embodiment such as DC to Pulsating DC or DC to modified Sine wave; DC to Pulsed DC or AC to Rectified AC; AC to pulsating Rectified AC; AC to programmable high frequency chopped AC; Modified Sine nave to pulsating DC. The operational details of this embodiment of Multimode Switched Power Converter can be understood by referring FIG. 6. FIGS. 8A, 8B, 8C, 8D, 8E and 8F illustrate the inputs, outputs and the switch states for the conversion modes of the converter depicted in FIG. 6.

Referring to FIG. 6, AC or DC input source 40 is connected across the terminals A and B of the Switched Bidirectional Power Steering Module 10 and the AC or DC output 50 is connected to at the terminal C and terminal D of the Switched Bidirectional Power Steering Module 10.

Input Sensor and DC Power generator Module 41 is connected across the input terminals A and B. The DC power Generator generates Bias Voltage, which is higher than the line voltage to drive the high side Switch gates. Output Sensor Module 51 is connected across the output terminals C and D. A Gate Driver Module 60 is connected between the Gate Control outputs 20A, 20B, 20C and 20D of the Microcontroller MC of the Multimode Power Converter Controller Module 20 and the gates of Switched Bidirectional Power Steering Module 10 switches 10A, 10B, 10C and 10D.

The DC power generated at Module 41 is connected to links 20E, and 20F of Microcontroller MC. The representative input power waveform generated at Module 41 is connected Link 20G of the Signal Processor SP. The representative waveform of the desired output at AC or DC output 50 is connected to the Link 20H of the Microcontroller. The output current sense S1 and S2 generated at Module 50 is connected to the 20O and 20P of the Microcontroller MC.

The Switched Bidirectional Power Steering technique of the present invention facilitates applying a positive, negative, no voltage to an AC or DC load from a DC, or an AC supply source.

Referring to FIG. 6, four switches 10A, 10B, 10C and 10D of Module 10, form the bidirectional full bridge. When switch pair 10A and 10D are closed the the switch pair 10A, 10D operate together and switch pair 10B, 10C operate together, circuit electrical path is input terminal 40A through the switch 10A to terminal C of Module 10, to the load terminal 50A and from the load terminal 50B to terminal D of Module 10, through the switch 10D back to the input terminal 40B. In this state, the Input 40 is connected directly across the load 50. When switch pair 10B and 10C are closed, the circuit electrical path is the input terminal 40A through the switch 10B, to terminal D of Module 10, to the load terminal 50B and from bad terminal 50A to terminal C of Module 10, through the switch 10C back to the input terminal 40B. In this state, the Input 40 is cross connected to the load 8.

By controlling the switch pair 10A, 10D and 10B, 10C a load can be directly connected to a source or cross connected to the source. In this manner, the Switched Bidirectional Power Steering Module 10, by controlling the switch pair 10A, 10D and switch pair 10B, 10C, facilitates converting positive voltage across source 40 to positive and or negative voltage across the load 50 and negative voltages across the source 40 can be converted to positive or negative voltage across the load 50.

The switches 10A, 10D, 10B and 10C, of the Switched Bidirectional Power Steering Module 10, can be operated in a range starting from a static state to desired operational frequency. This switching feature is used for conversion of DC to Pulsating DC or DC to modified Sine wave, or AC to Rectified AC; AC to pulsating Rectified AC, AC to programmable high frequency AC without amplitude changes, Modified Sine wave to pulsating DC, as shown in FIGS. 8A, 8B, 8C, 8D, 8E, and 8F.

The Input/Output Signal Processor SP of the Multimode Converter Controller Module 20 senses the input source connected at link 20G and the desired output source connected to link 20H and processes the information and sends it to the Microcontroller MC. Microcontroller MC generates the appropriate signals at links 2A, 2B, 2C, and 2D to close switch pairs 10A, 10D and 10B 10C. FIGS. 8A, 8B, 8C, 8D, 8E, and 8F shows the switching pair states for DC, AC sine wave and modified sine wave inputs and the desired pulsating DC, modified sine wave, rectified AC sine wave, high frequency AC outputs.

Figure 7:
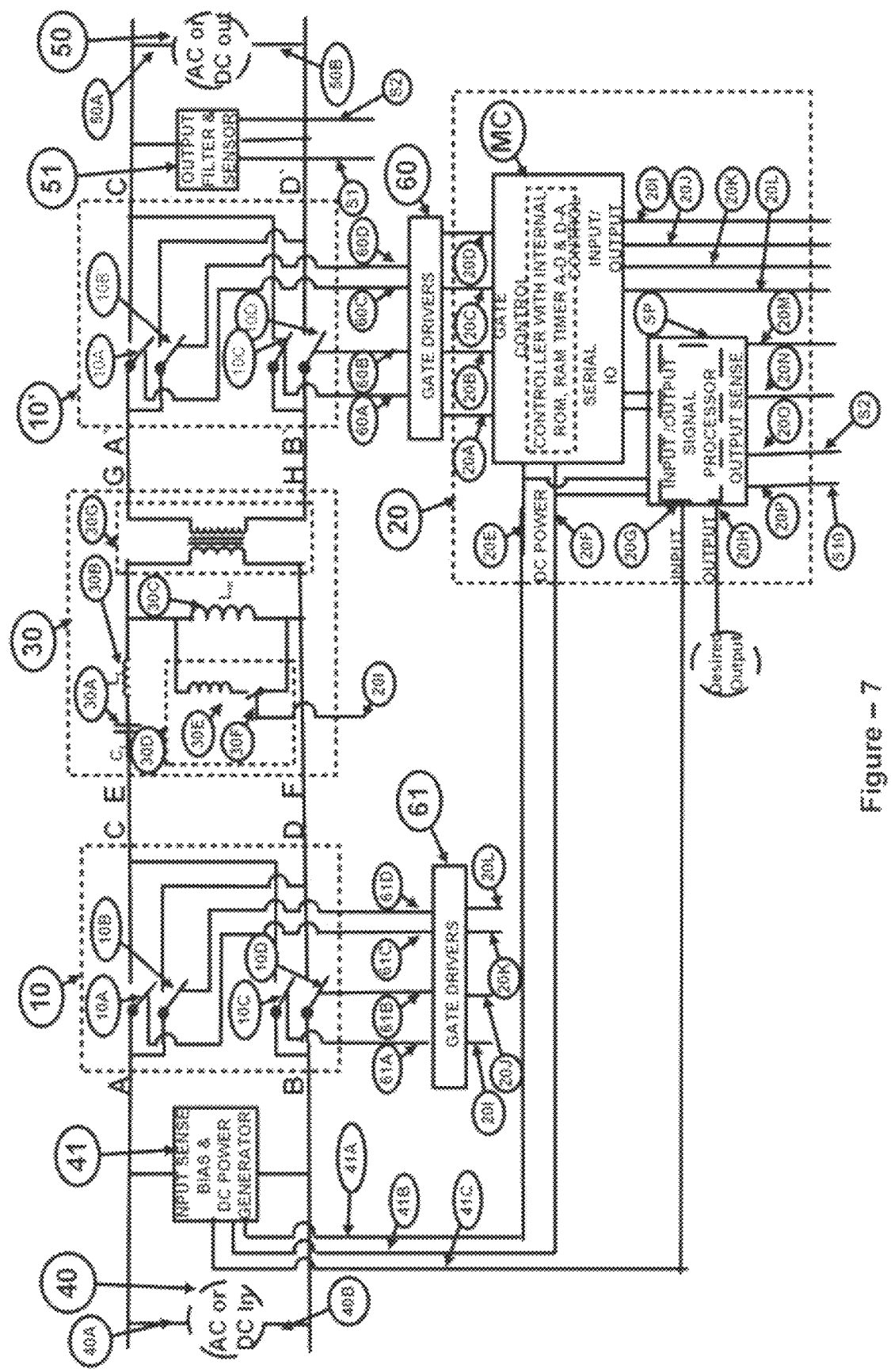
FIG. 7 shows on embodiment of the Multimode Switched Power Converter with the Power Amplitude Modulation Module 30. The FIG. 7 also depict bidirectional conversion feature, where a load can become power input to the converter and a power input source can become a power output of the converter.
Figure 8C:
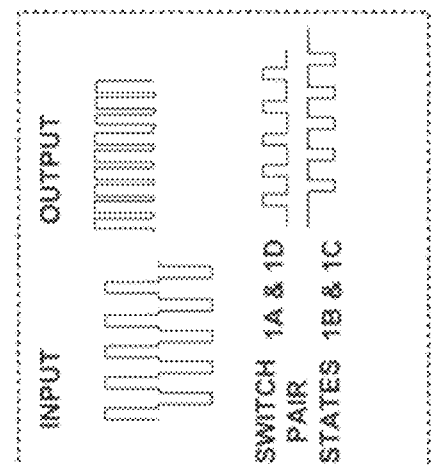
FIGS. 8A through 8F depicts various Inputs, the converted Output and Switch operations of the Switched Bidirectional Power Steering Module 10 for the Multimode Switched Power Converter of FIG. 6.
Figure 8F:
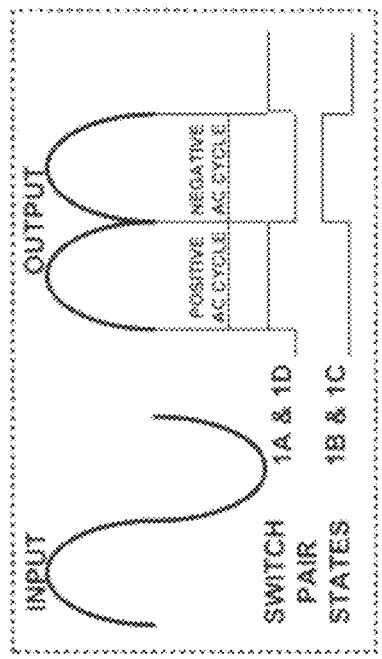
Figure 8E:
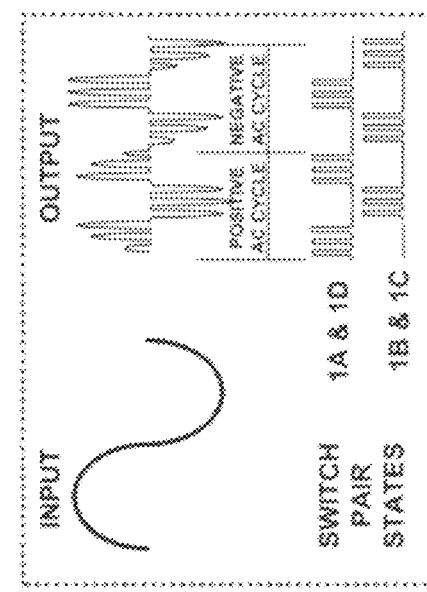
Figure 8B:
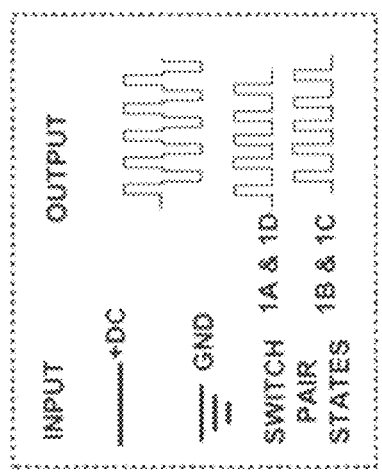
Figure 8A:
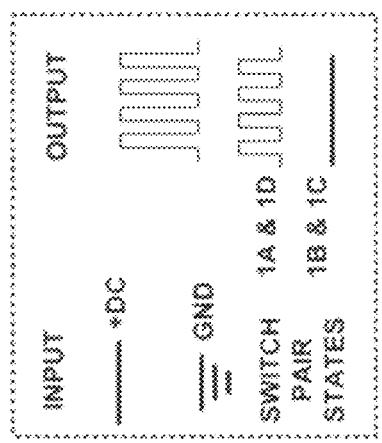
Figure 8D:
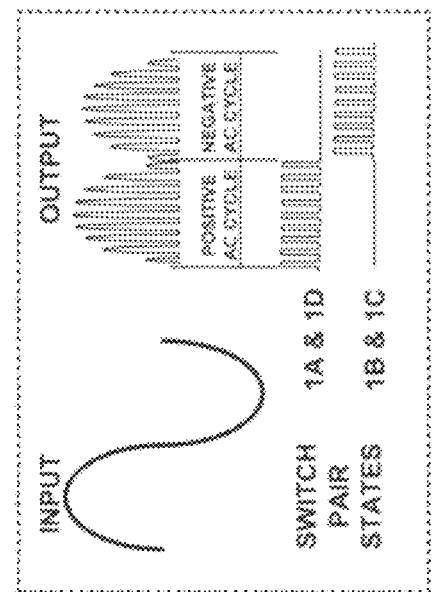

For power conversion applications that require amplitude changes and or shaping, the Power Amplitude Modulation Module 30 is used, as shown in FIG. 7. FIG. 7 is similar to FIG. 6 with the exception of the Power Amplitude Modulation Module 30, and an additional Switched Bidirectional Power Steering module 10' are inserted between the Switched Bidirectional Power Steering Module 10 terminals C and D and the output Sensor 51.

The Capacitor 30A, Inductor 30B and Inductor 30C in parallel with the inductances of the Transformer 30G form the LLC resonant circuit form the Power Amplitude Modulation Module 30. The Gain of the LLC resonant circuit changes with frequency. At resonant frequency, the LLC presents no impedance from inductive and capacitive elements, as the inductive and capacitive reactance cancel each other. At frequencies lower or higher than the resonant frequency, circuit the offers impedance in proportion to the frequency deviation from the resonant frequency. To implement DC level conversion to an AC Sine wave or AC sine wave conversion to a DC level, the present invention uses the buck boost capability of the LLC resonant circuit. The input DC or AC sine wave is divided by into a number of buck or boost stages. A power loss budget, proportional to the required efficiency of the Multimode Switched Power Converter is established for each buck or boost stage. Each stage is associated with a particular frequency to buck or boost the input power voltage to match the output power voltage. The Microcontroller MC of Multimode Converter Controller Module 20, changes the gate control signals at each stage in proportion to the frequency of that stage. These control signals 20I, 20J, 20K and 20L are used by the Gate Driver Module 61 to change the operational frequency of the switches 10A, 10B, 10C and 10D of Switched Bidirectional Power Steering Module 10. The operational frequency of the switches at each stage determines the frequency of LLC circuit, which in turn changes the gain of the LLC circuit. When a Buck or Boost stage operation falls outside its power loss budget for given stage, the characteristic values of the circuit component can be changed by adding series or parallel Switched Elements. An exemplary Switched Element 30D, comprising an Inductor 30E and a Switch OF is shown in FIG. 7. The Gate of Switch 30F is connected Microcontroller MC Link 20I. The value of the Inductor 30C is changed by switching inductor element 30E on or off using switch 30F, there by the resonant frequency of the LLC circuit of Power Amplitude Modulation Module 30 is changed. If a circuit needs more switches than those shown in FIG. 7, then a different Microcontroller MC can be used, without deviating from the scope of the present invention.

The Amplitude of the modulated waveform of the Module 30 can be increased or decreased using transformer 30G. The transformer also provides isolation between the input power source and the output load. In FIG. 7, the Switched Bidirectional Power Steering Module 10' is advantageously connected to the output of the transformer across the terminals G and H. This arrangement obviates the output steering diodes at the output of the transformer that are typically needed for LLC conversion and is well known in the art, and facilitates deriving either PC or AC outputs from a DC or an AC power source. The Microcontroller MC connects and disconnects the Switched Elements 10A', 10B', 10C' and 10D' of module 10' using the link 20A, 20B, 20C and 20D via Gate driver 60. Gate driver 60 controls the switch pairs 10A', 10'D and 10B', 10C' to facilitate steering the amplified output pulses of the Power Amplitude Modulation Module 30, to the load. Bidirectional operation is similar to the conversion operation described above. In this mode, the Module 10' provides the function of module 10 and vice versa. Similarly, the Output sensor module 51 provides the function of Input sensor module 41.

Multimode Switched Power Converter shown in FIG. 7 converts DC-DC, DC-AC, AC-AC and AC-DC in either direction, without the limitations of the Multimode Switched Power Converter of FIG. 6.

The variable gain feature of the Power Amplitude Modulation Module 30 of the Multimode Switched Power Converter shown in FIG. 7, can be used to implement programmable output voltage levels frequency and a specified time. For a desired output level the Microcontroller MC changes the buck and boost gain of the Power Amplitude Modulation Module 30.

The desired voltage level can be indicated locally by mechanical switches or representative signals in a known proportion to the required outputs or the parameters can be programmed from a remote source. The circuit gain in proportion to the desired amplitude, for each buck or boost, stage can be stored in the non-volatile memory of the Microcontroller MC. Based on local mechanical switch indicators, representative signals using link 20H of the signal processor SO or instructions from a remote source using serial IO, the required amplitude can be provided by changing the LLC circuit gain. Switched Elements can be commissioned or decommissioned to implement the variable amplitude or other particular features of given amplitude, such as output regulation by Zener Diodes or other voltage regulation elements. This feature is utilized to provide programmable amplitude of the Multimode Switched Power Converter. The programmable features can be extended to programmable selection of the output type to be either DC or AC. The Input and output monitoring capability is used to provide programmable current limits for any give application. If the sensed currents exceed a specified limit, the converter can shut off.

These features are used to derive a combined converter that, provides different output levels and different output type of AC-DC, AC to AC of battery chargers and power adaptors.

The switches of the Switched Bidirectional Power Steering Module 10 can be operated in a series of ON and OFF modes, for programmable duration of time, by the Microcontroller MC. The Converter can operate in a series of predetermined operational stages. This feature is used to provide functions, without the need of external modules, such as, but not limited to, Soft Start, Dimming, Soft Shut Down, Idle converter Shut Down, Power Fade in and Fadeout effects, Current and Voltage phase adjustments to maintain Power Factors and Time of the Day operational mode changes. The input and output sensing also facilitates idle current sensing for a predetermined duration and shutting of the converter to conserve electrical energy.

The various operational features of the Multimode Switched Power Converter can be further explained by Operational States and Trigger Events to transition to different states. Each state is entered on a Trigger Event. Each State performs switching mode defined for the state and optionally generates an Exit Event. The operational states define the switching action during the state. The Microcontroller MC programs the ON-OFF times for the switches, on a clock by clock basis, for each state of the Multimode Switching Power Converter. Trigger Events could be external events such as user controlled ON/OFF switch of the Multimode Switching Power Converter, a timed event like Time of the Day clock of the Microcontroller MC or timer event.

Each state may have one trigger event to enter a particular state, the cycle-by-cycle output action to be taken during the event, the duration of the event and an exit event that is generated internally or set externally, such as dimmer potentiometer, sensing a remote switch closure etc. The Microcontroller MC maintains an event table to indicate the action to be taken for each event. This event table is executed when an entry event trigger is received until the exit event. The events, new states, change to programmed states, can be uploaded over the serial communications to the controller.

In an exemplary embodiment, Multimode Switched Power Converter event states are Soft-Start; or Fade-in state; Low Power State or Sleep State; Shut Down, or Fade-Out State, Normal Operational State and Over Drive State. Each state is described herein for an AC Input and AC Output. However, these descriptions are applicable to all modes of operation supported by the converter. The states are only illustrative and other states can be designed to operate the converter to derive additional features.

Figure 14A:
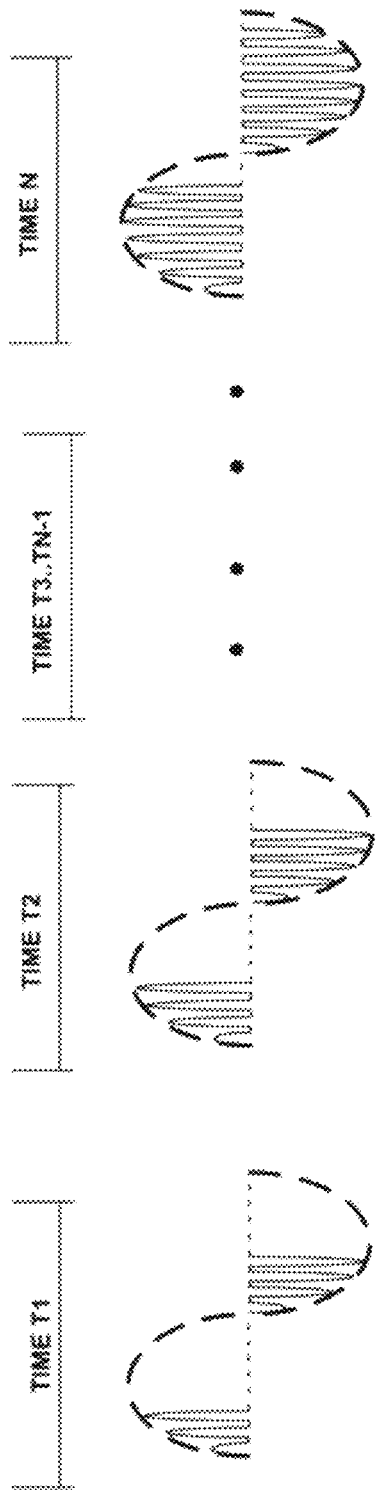
FIG. 14A and FIG. 14B illustrates the waveform of the output in Fade-in and Fade-out states respectively of one embodiment of the convertor.

In an exemplary embodiment, in a Soft Start or a Fade or a Inrush Current Control State, the switching operation of the Switched Bidirectional Power Steering Module 10 from a only few clock cycles for each AC Input cycle, is gradually increased for a given length of time after which the switching enters the Normal Operational State. The typical entry trigger for Soft Start state is the Switch ON condition or power restart from sleeping state and the typical Exit state is Normal Operational State. Input AC cycle, the switching waveform and the Output in a Soft Start State are shown in FIG. 14A, from TIME T1 to TIME TN.

Figure 14B:
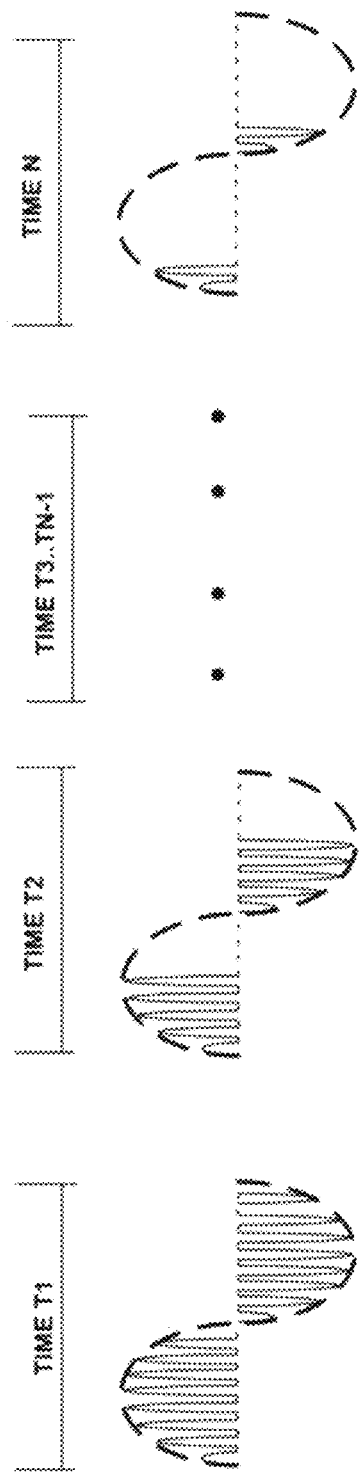
Figure 14:
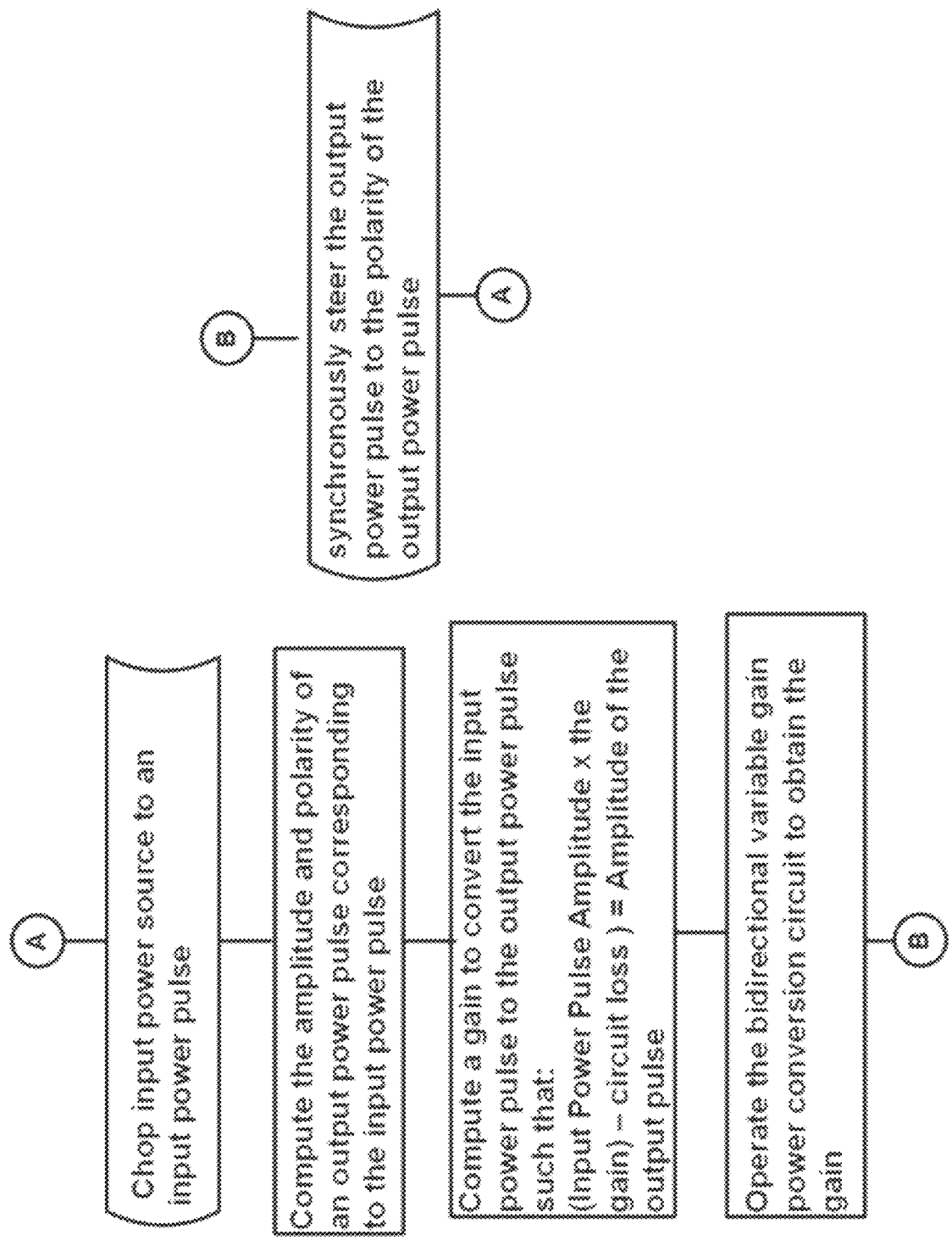
FIG. 14C shows the Flow Chart of the operation of an exemplary embodiment of the Multimode Switched Power Converter.

In a Fade-Out or a Soft Shut down state, the switching operation, of the Switched Bidirectional Power Steering Module 10, is gradually decreased over a length of time. The typical trigger event to enter the Fade Out is a Switch OFF event a time based programmed shut down event, a circuit error state, such as high temperature fault. The Exit State is turning off the converter. Fadeout state operation is shown in Time T1 to TIME TN of FIG. 14B.

In an Over Drive State, the switching frequency is varied to derive higher converter circuit gain than the normal operational gains for that state, for a given length of time. The operation is similar to the Normal operational state, but with a different frequency. The typical trigger event to enter Over Drive State are to provide a very bright light for a short duration of time of a programmed lighting, the pre-charge operation, pulsed output, providing continued service during the brown out conditions. The typical exit triggers are Normal Operational State, or the Shut Down State.

In a Normal Operational State, the switches are operational over the entire AC cycle. The frequency is continuously varied during an AC cycle to modulate the switches to the gain of the converter circuit to obtain the desired out put at the secondary power source. The typical trigger to enter a Normal Operational state is the exit events of any of the states such as Soft-Start, Over Drive state. The typical exit triggers, shut off, brownout condition, or idle state.

The normal operation can be understood by examining an exemplary embodiment for the AC-to-AC conversion, as shown in FIG. 7. In this exemplary embodiment, the Input AC is fifty hertz (HZ) and the switching frequency of the AC Switched Converter is hundred Kilo Hertz (100 KHz). Each AC cycle is ten (10) milli-seconds in duration and each clock cycle is ten microseconds in duration. At a constant frequency, the number possible switch operation is thousand (1,000) clock cycles. Assuming equal switch ON and OFF times, there will be five thousand (5,000) switch operations in a cycle. In this exemplary embodiment, the AC Cycle is divided to ten sub cycle of one milli-second each. The frequency is varied every cycle to vary the gain of the converter circuit, to get the required output. The Input amplitude at any instant of sine wave multiplied by circuit gain subtracting the circuit losses should equal to the desired output amplitude, with in the specified tolerance. The gain could be a fraction or greater than unity gain of the circuit.

FIG. 9A shows input AC, 9B shows switch frequency variation during an AC cycle, FIG. 9C show the output across the Inductor 30C of FIGS. 7, and 9D show the AC-AC conversion operations of switch pairs 10A, 10D and 10B, 10C respectively.

The operations of the exemplary Multimode Switched Power Converter of FIG. 7 can be further understood by examining the Over Drive state for Brownout Condition and other input AC variations. The signal processor SP, measures the amplitude of AC Input voltage, provided at Link 20G. The brownout condition or reduced AC amplitude, excessive input AC Voltage spikes, normal operation are detected by the Signal Processor SP. During the normal operation of the Multimode Bidirectional Multimode Power Converter, the Microcontroller MC uses the predetermined set of switching frequencies to obtain the desired output by buck boost operations based on the normal input AC wave. During brown out condition, the Control Microcontroller MC adjusts the gain by adjusting the switching frequency proportionately to the reduced input AC voltage, as sensed by the Signal Processor SP. The Input amplitude at any instant of sine wave multiplied by circuit gain subtracting the circuit losses should equal to the desired output amplitude, with in the specified tolerance. In the event of sustained Excessive Voltage, the Microcontroller MC turns the switches OFF using the links 20I, 20J, 20K 20L, 20A, 20B, 20C and 20D and enters the Sleeping State.

The DC to AC operation of the exemplary Bidirectional Multimode Power Converter shown in FIG. 7 is similar to the AC-to-AC conversion operation. Instead of the AC Cycle duration, the switches are operated on a periodic cycle basis to obtain the AC out put. The Frequency of the operation of the switches at each stage is varied to vary the gain of the converter circuit. FIGS. 10A, 10B, 10C and 10D depict the input DC source, Switch frequency over a period equivalent to an AC input Cycle and the switch pair operation respectively.

The AC to DC operation of the exemplary Multimode Switched Power Converter shown in FIG. 7 is similar to the AC-to-AC operation. FIGS. 11A, 11B, 11C and 11D depict the input AC source, Switch frequency over a period of AC input Cycle and the switch pair operation respectively.

The AC-to-AC for same frequency AC output operation and DC-to-DC operation is possible in the exemplary Bidirectional Multimode Power Converter shown in FIG. 7. FIG. 12A, 12B, 12C, 12D, the conversion of AC-to-AC of same frequency, and 13A, 13B, 13C and 13D depict DC-to-DC conversion operation.

The Multimode Switched Power Converter shown in FIG. 7 converts AC or DC to AC or DC outputs in any combination and inherently provides features such as Soft Start, dimming, in-rush current control. It is noted that Link Capacitor that is needed in a conventional power converter is not needed in the Multimode Switched Power Converter.

Figure 15:
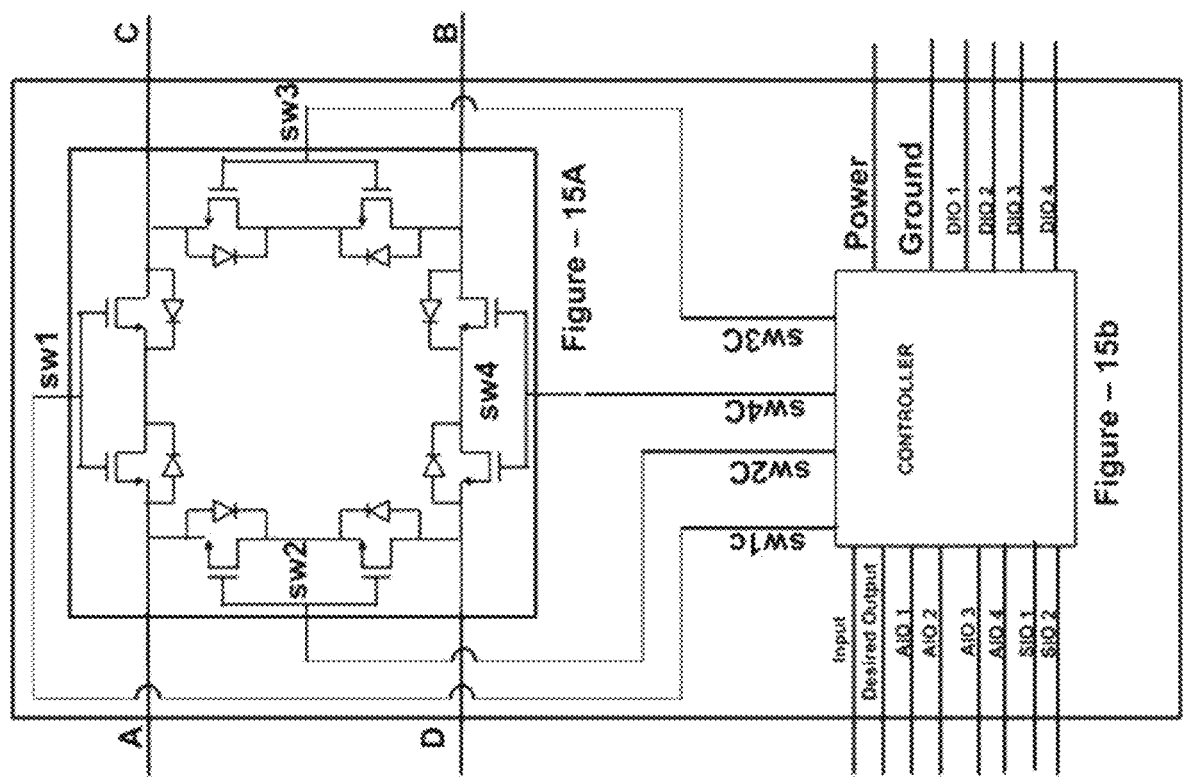
FIG. 15 illustrates an exemplary embodiment of a converter comprising Switched Bidirectional Power Steering Module 10 using four back-to-back power switches as illustrated in FIG. 15A and an exemplary Multi Function Converter Controller as shown in FIG. 15B.

An exemplary embodiment of Switched Bidirectional Power Steering (M) Module 10 can be implemented with switching elements as shown in FIG. 15A. This semiconductor controller device can be integrated with the Controller of FIG. 15B, which provides all the functions described for Multimode Converter Controller Module 20 as shown in FIG. 6. The links AIO 1, AIO 2, AIO 3 and AIO 4 provide Analog Input Output interface. SIO 1 and SIO 2 provide serial interface. DIO 1, DIO 2, DIO 3 and DIO 4 provide digital interface. Links A, B, and C, D of FIG. 15 a provide Power Input and converted Output interfaces. Power and Ground pins provide power to the Multimode Converter Controller Module. SW1, SW2, SW3, and SW4 provide Gate drive to the Switches.

A semiconductor device as show in FIG. 15 could be constructed interconnecting 15A, 15B, and providing Input and Output pins to implement an exemplary Power Converter.

Figure 17:
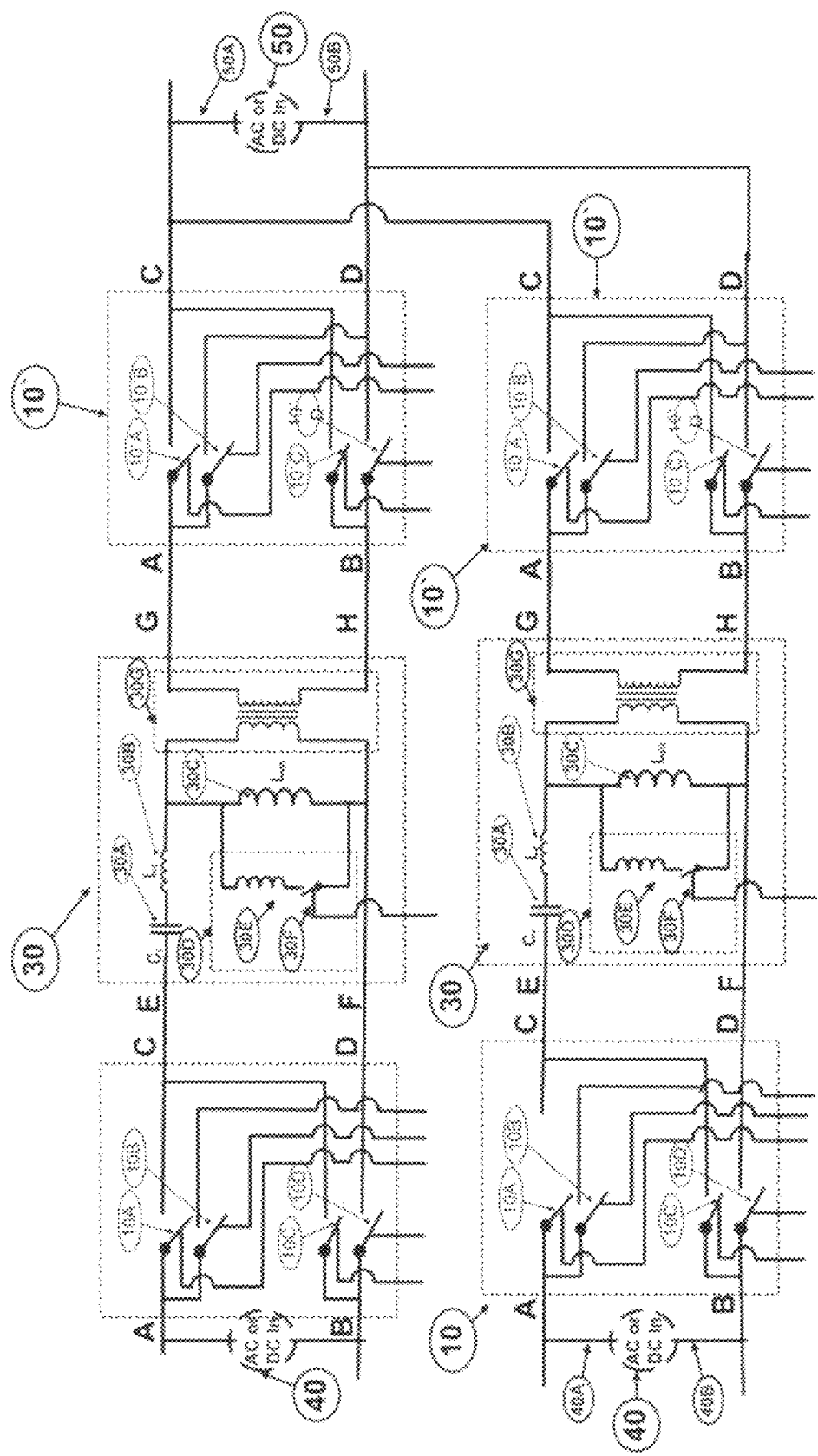
FIG. 17 depicts one embodiment of the Bidirectional Multimode Switched Power converter, comprising multiple Switched Bidirectional Power Steering Modules (10, 10' missing) and multiple Power Amplitude Modulation Modules 30 arranged to facilitate the use of different power input sources to supply converted power to a bidirectional load. The Load can become the source such as the electric vehicle motor.
Figure 18:
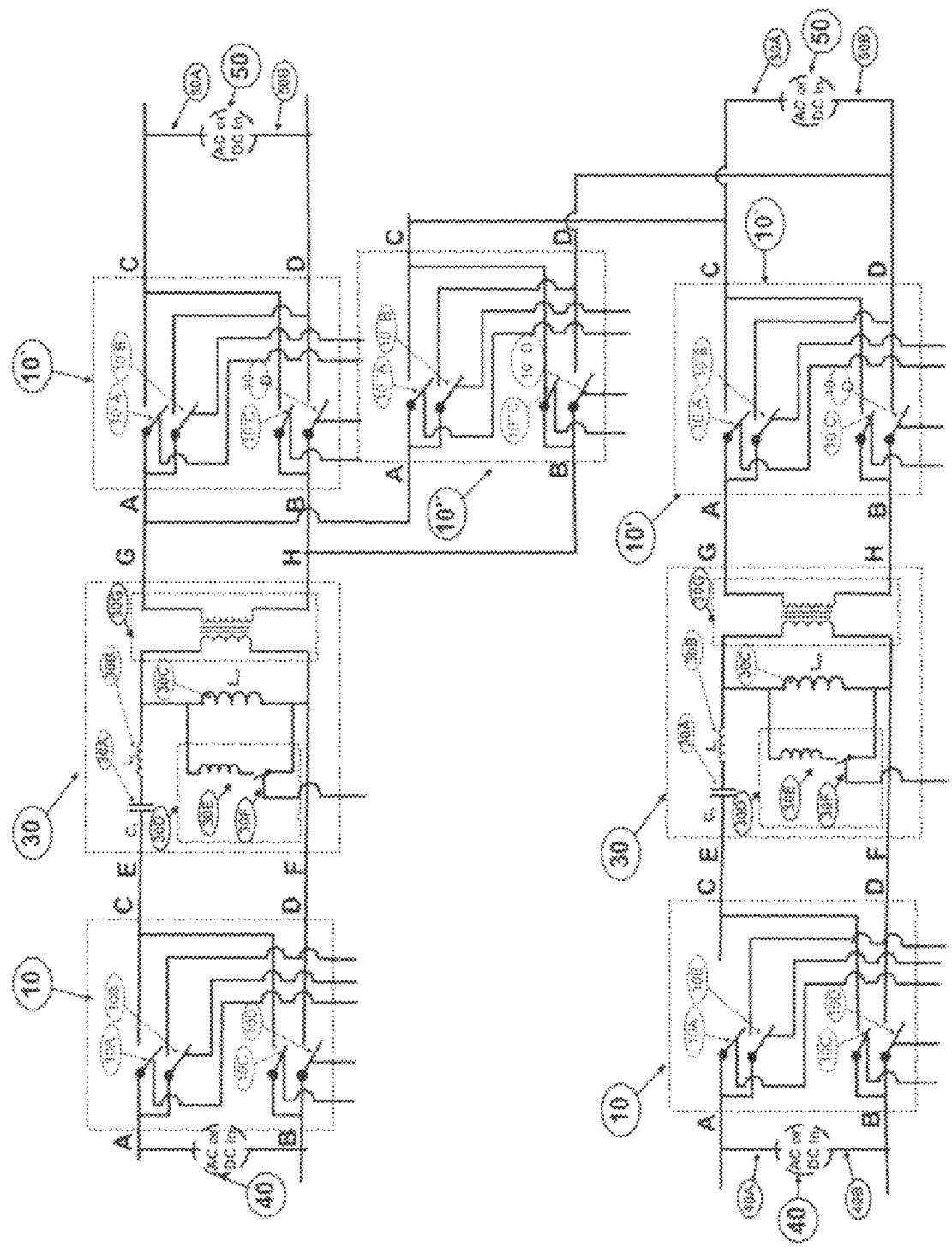
FIG. 18 depicts one embodiment of the Bidirectional Multimode Switched Power Converter comprising multiple Switched Bidirectional Power Steering Modules 10 and 10' and multiple Power Amplitude Modulation Modules 30 arranged to facilitate plurality of bidirectional power input sources to supply converted power to plurality of bidirectional loads.

Multiple bidirectional power sources and bidirectional loads can be connected using multiple Switched Bidirectional Power Steering Module 10 as shown if FIG. 17 and FIG. 18. The circuit paths can be switched between sources and loads instantaneously.

It should be evident to a person skilled in the art that in a similar fashion to the exemplary embodiments shown FIGS. 17, and 18, many applications are possible such as and not limiting to connecting an alternate energy source to a local load and a utility AC Grid.

Since the Bidirectional Multimode Power Converter is capable of converting AC or DC input to AC or DC output, two different sources such as grid AC power and alternate energy DC source can be used to supply either AC or DC loads for lighting applications. The Electric vehicle's motor could be supplied with AC form DC battery bank and the freewheeling energy from the windings can be stared in a capacitor banks. The energy stored in the capacitor bank could be used to supply instantaneous additional energy needed for uphill driving. Similarly, the energy could be stored in the capacitor bank and the battery can be charged from the capacitor banks.

The description presented hereto is for the purpose of explanation of specific embodiments. These exemplary embodiments and the modules were chosen and described explain the principles of the invention and its practical applications. Many modifications and variations are possible in view of the description of the embodiments. The illustrative discussions above are not intended to be exhaustive or to limit the invention to the precise embodiments disclosed.

What is claimed is:

1. A method of bidirectionally converting electrical power from a first power source to a second power source in a single conversion stage, where in the first power source is either a single phase power source of a first alternating current frequency and amplitude or a direct current power source of a first voltage level and polarity, and, the second power source is either a single phase power source of a second alternating current frequency and amplitude or a direct current power source of a second voltage level and polarity, where in the first power source is connected to a first port of a bidirectional variable gain power conversion circuit operable by a programmable controller and the second power source is connected to a second port of the bidirectional variable gain power conversion circuit operable by the programmable controller, where in the first power source can be an input power source and the second power source can be an output power source, or the second power source can be in the input power source and the first power source can be the output power source, the method comprising the iterative steps of: chopping the input power source to an input power pulse, and computing an amplitude and polarity of an output power pulse corresponding to the input power pulse, and computing a gain to convert the input power pulse to the output power pulse such that the input power pulse multiplied by a gain subtracted by a circuit loss equals the amplitude of the output power pulse; and operating the bidirectional variable gain power conversion circuit to obtain the gain, and synchronously steering the output power pulse to the polarity of the output power source.

2. Method of claim 1 further comprising the steps of galvanically isolating the input power pulse from the output power pulse.

3. Method of claim 1 further comprising the steps of providing external communications to the bidirectional variable gain power conversion circuit operable by the programmable controller.

4. Method of claim 3 further comprising the steps of providing soft startup, soft shut down on idle current, soft shut down on over current and dimming of the output power pulse utilizing the bidirectional variable gain power conversion circuit operable by the programmable controller.

5. Method of claim 1 further comprising the steps of providing programmable time of a day operation of the bidirectional variable gain power conversion circuit operable by the programmable controller.

6. Method of claim 1 further comprising the steps of providing an additional bidirectional variable gain power conversion circuit operable by a programmable controller in parallel with the bidirectional variable gain power conversion circuit operable by a programmable controller.

* * * * *